United States Patent

[11] 3,603,347

[72] Inventor Joseph J. Paolini
 103 Adams St., Newton, Mass. 02158
[21] Appl. No. 847,596
[22] Filed Aug. 5, 1969
[45] Patented Sept. 7, 1971

[54] FULL FLOW WITH SHUTOFF AND SELECTIVE DRAINAGE CONTROL VALVE
 6 Claims, 5 Drawing Figs.
[52] U.S. Cl. .................................................... 137/625.17,
 251/263
[51] Int. Cl. ........................................................ F16k 11/00
[50] Field of Search ............................................ 137/625.17,
 625.41; 251/227, 263, 310

[56] References Cited
UNITED STATES PATENTS
| | | | |
|---|---|---|---|
| 1,032,649 | 7/1912 | Bieniek | 251/310 X |
| 3,269,412 | 8/1966 | Badke | 137/625.17 |
| 3,419,246 | 12/1968 | Burgess | 251/263 X |

Primary Examiner—William R. Cline
Attorneys—Herbert E. Farmer, John R. Manning and Garland T. McCoy ABSTRACT: A multiorifice valve that provides different patterns of fluid flow is disclosed. Selective movement of a valve stem in both axial and rotational senses produces various combinations of alignment between transverse bores in the valve stem and multiple orifices in a valve body.

PATENTED SEP 7 1971 3,603,347
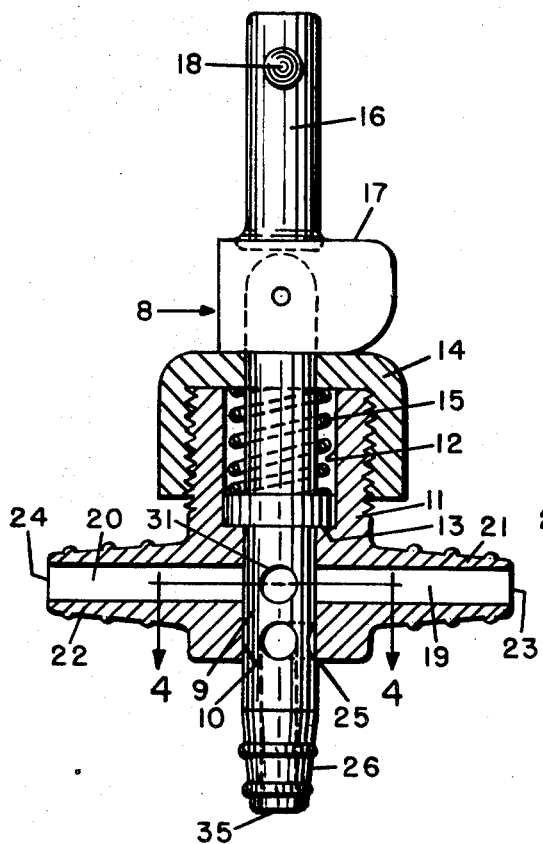
FIG.1.
FIG.3.
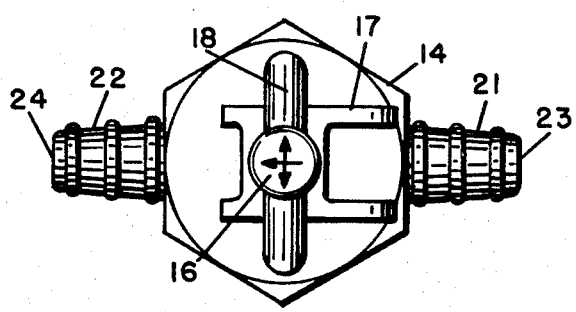
FIG.2.
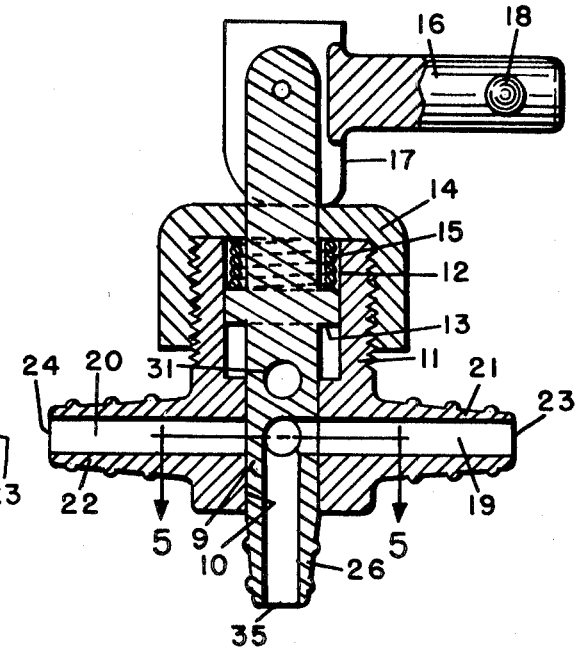
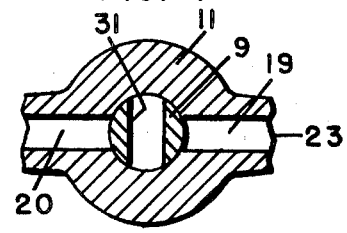
FIG.4.
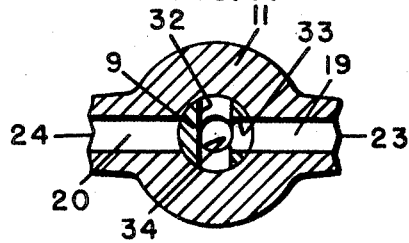
FIG.5.
INVENTOR:
JOSEPH J. PAOLINI,
BY
*J. H. McCoy*
*Herbert E. Farmer*
ATTORNEYS

FULL FLOW WITH SHUTOFF AND SELECTIVE DRAINAGE CONTROL VALVE

ORIGIN OF THE INVENTION

The invention described herein was made by an employee of the U.S. Government and may be manufactured and used by or for the government for governmental purposes without the payment of any royalties thereon or therefor.

BACKGROUND OF THE INVENTION

This invention relates generally to a fluid flow control valve and, more particularly, relates to a multiposition, three-orifice fluid flow control valve.

There exist various applications requiring fluid flow between individual branches of an overall system. In some applications selective control of the directions and patterns of fluid flow between particular system portions is desired. For example, in various laboratory and hospital test techniques it is necessary to control fluid flow between a pair of primary branches which must also be capable of independent draining or purging. Thus, a need exists for multiple orifice valves that permit selected patterns of fluid flow.

The object of this invention, therefore, is to provide a simple and inexpensive valve that selectively produces multiple patterns of fluid flow between individual branches of an overall system.

SUMMARY OF THE INVENTION

The invention is characterized by the provision of a valve having a valve body and a valve stem defining first, second and third fluid flow orifices. The valve stem is axially movable within the valve body between a primary position that seals the third orifice and an auxiliary position. While in the primary position the valve stem can be rotated between an open position permitting full fluid flow between the first and second orifices and a closed position completely obstructing fluid flow therebetween. Rotational movement of the valve stem into a composite position while in said auxiliary axial position permits fluid flow between all of the first, second and third orifices. Conversely, rotation of the stem into a selective position permits fluid flow only between the first and third orifices while rotation into an alternate selective position permits fluid flow only between the second and third orifices. By selecting an appropriate valve position any desired pattern of fluid flow can be produced between system branches connected to the three valve orifices.

According to a featured embodiment of the invention, the valve body possesses a cylindrical cavity communicating with the first, second and third orifices and the valve stem comprises an elongated cylindrical member slidably fitted into the cylindrical cavity and having axially spaced transverse bores that permit fluid flow between the orifices. The transverse bores include a linear bore adapted for alignment between the first and second orifices with the valve stem in the primary axial and open rotational positions and for nonalignment therewith with the valve stem in either the auxiliary axial or closed rotational positions. A T-shaped transverse bore is longitudinally spaced from the linear bore and communicates with the third orifice via a longitudinal bore. A head portion of the T-shaped bore is adapted for alignment between the first and second orifices with the valve stem in the auxiliary axial and composite rotational positions. The T-shaped bore includes also a leg portion adapted for alignment with the first orifice with the valve stem in the auxiliary axial and selective rotational positions and for alignment with the second orifice with the valve stem in the auxiliary axial and alternate selective positions. This embodiment provides in an extremely simple and inexpensive unit the various fluid flow possibilities described above.

Another feature of the invention entails a lever and cam mechanism pivotally connected to the cylindrical stem member and a compression spring that opposes axial movement of the valve stem in one direction. The lever and cam mechanism facilitates axial movement of the stem between its primary and auxiliary positions and the compression spring insures proper alignment of the stem's transverse bores with appropriate valve body orifices.

According to still another feature of the invention the first and second orifices are formed by diametrically opposed hollow nipple portions extending from the valve body and adapted to accommodate suitable tubing and the third orifice is formed by a hollow extension of the valve stem also adapted for connection with suitable tubing.

BRIEF DESCRIPTION OF THE DRAWINGS

These and other features and objects of the present invention will become more apparent upon a perusal of the following specification taken in conjunction with the accompanying drawings wherein:

FIG. 1 is an elevation view partially in section illustrating the functional relationship between the various components of the invention;

FIG. 2 is a plan view of the valve shown in FIG. 1;

FIG. 3 is a sectional view illustrating another position of the valve stem shown in FIG. 1;

FIG. 4 is a cross-sectional view taken along lines 4—4 shown in FIG. 1; and

FIG. 5 is a cross-sectional view taken along lines 5—5 of FIG. 3.

DESCRIPTION OF THE PREFERRED EMBODIMENT

Referring now to FIGS. 1–3 there is shown a valve stem 8 including an elongated cylindrical member 9 that is slidably fitted into a cylindrical cavity 10 of a valve body 11. A counterbore 12 in the valve body 11 accommodates a shoulder 13 on the stem member 9. Restrained between the shoulder 13 and a retaining nut 14 is a compression spring 15. A lever arm 16 terminates with a cam portion 17 that is pivotally attached to the cylindrical valve stem member 9. Extending through an aperture in the opposite end of the lever arm 16 is an actuating handle 18.

Extending out of diametrically opposed positions on the valve body 11 are a pair of identical nipples 21 and 22 having hollow passages 19 and 20 that form, respectively, a first orifice 23 and a second orifice 24. The nipples 21 and 22 are externally ribbed to accommodate flexible tubing and the orifice passages 19 and 20 provide communication between the orifices 23 and 24 and the central cavity 10. An opening 25 in the valve body 11 accommodates a projection 26 of the cylindrical valve stem member 9. The projection 26 is also externally ribbed to accommodate flexible tubing.

As shown in FIGS. 4 and 5, the cylindrical stem member 9 possesses a linear transverse bore 31 and a longitudinally spaced T-shaped transverse bore including a head portion 32 and a leg portion 33. A longitudinal bore 34 extends between the T-shaped bore and the termination of projection 26 providing a third orifice 35.

FIG. 1 shows the valve with the valve stem 8 in a primary position with the linear bore 31 positioned in a horizontal plane defined by the orifice passages 19 and 20. In this position, T-shaped bore 32 and 33 as indicated in FIG. 5 is axially spaced from passages 19 and 20 thereby sealing the third orifice 35. Also illustrated in FIG. 1 is a closed rotational position of the valve stem 8 wherein the linear bore 31 is perpendicular to or nonaligned with the orifice passages 19 and 20. As shown, the first and second orifices 23 and 24 are closed in this position by solid portions of the cylindrical stem member 9 that seat against the passages 19 and 20. Thus, in the primary axial and closed rotational positions of the valve stem 8 fluid flow is completely obstructed between all three orifices 23, 24 and 35. After turning the handle 18 such that the cylindrical stem member 9 rotates 90° from the closed position illustrated in FIG. 1, the linear bore 31 is aligned with the passages 19 and 20. This open rotational position of the valve stem 8 permits full and unobstructed fluid flow between first orifice 23 and the second orifice 24.

FIG. 3 shows the valve with the valve stem 8 in an auxiliary axial position created by downward pivotal movement of the lever arm 16. During this pivotal movement, the surface of the cam 17 engages the nut 14 producing upward axial movement of the stem member 9 against the biasing force exerted against the shoulder 13 by the compression spring 15. The compression spring 15 facilitates desired horizontal alignment of the T-shaped bore 32 and 33 with the orifice passages 19 and 20. In the selective rotational position illustrated in FIG. 3, the leg portion 33 of the T-shaped bore is directly aligned with the orifice passage 19 while a solid portion of the stem member 9 seals the orifice passage 20. Thus, in this selective rotational position, the passage 19 and the longitudinal bore 34 provide communication between the first orifice 23 and the third orifice 35 permitting fluid flow therebetween.

Either clockwise or counterclockwise rotation of the lever arm 16 90° from the position shown in FIG. 3 moves the stem member 9 into a composite rotational position wherein the head portion 32 of the T-shaped bore is aligned with the orifice passages 19 and 20. In this position, the orifice passages 19 and 20 and the longitudinal bore 34 provide communication between all three orifices 23, 24 and 35 thereby permitting fluid flow therebetween. Further rotation of the lever arm 16 180° from the position shown in FIG. 3 moves the stem member 9 into an alternate selective position wherein the leg portion 33 of the T-shaped bore is aligned with the orifice passage 20 and the orifice passage 19 is sealed by a solid portion of the stem member 9. In this position, communication is provided only between the second orifice 24 and the third orifice 35 by the orifice passage 20 and the longitudinal bore 34.

During typical use of the valve, full fluid flow is provided between system branches connected to the first and second orifices 23 and 24 with the valve stem 8 in the open position described above. Conversely, rotation of the stem into the closed position produces a positive shutoff between all parts of the system. After pivoting the lever arm 16 into the auxiliary axial position shown in FIG. 3, full fluid flow is provided between all system branches by rotating the stem member 9 into the composite position described above. In that position, for example, the system portions connected to the first and second orifices 23 and 24 can be simultaneously filled, drained or purged through the orifice 35. Rotation of the stem member 9 into the selective position permits independent draining, filling or purging of only that system branch connected to the first orifice 23. Similarly, rotation of the stem member 9 into the alternate selective position permits independent draining, filling or purging of only that system branch directly connected to the second orifice 24. Thus, the valve of the present invention can be selectively operated to produce any desired pattern of fluid flow between system branches connected to its three orifices.

Obviously, many modifications and variations of the present invention are possible in light of the above teachings. For example, the ribbed nipples 21, 22 and 26 can be replaced by other conventional types of hose connections. Also, seals may be placed on stem member 9 or valve body 11 to obtain high-pressure capabilities.

What is claimed is:

1. A valve comprising:
a valve body defining a first and a second fluid flow orifice and a valve stem means defining a third fluid flow orifice;
said valve body comprises a cylindrical cavity wherein said first and second orifices are located in diametrically disposed positions on said valve body and wherein said cylindrical cavity further comprises a longitudinal bore communicating with said third orifice located in said valve stem means;
said valve stem means operatively engaging said valve body and adapted to be rotatable and to be movable axially with respect to said valve body;
said valve stem means comprising a cylindrical stem having upper and lower apertures spaced apart and parallel to each other and having a bore in said stem to form said third orifice up to said lower aperture and a third aperture in said stem intersecting said lower aperture at 90° horizontally to form a double-leg T-shaped bore having the legs of the tee separated geometrically by 90°;
positioning means in said valve body for aligning said upper aperture with said first and second orifices while simultaneously preventing said lower aperture from any possible alignment with said first and second orifices to permit full flow between said first and second orifices;
means for rotating said valve stem means in said valve body to prevent fluid flow between said first and second orifices when said upper aperture is rotated 90° from its full flow position;
and actuating means for aligning said lower aperture with said first and second orifices while simultaneously preventing said upper aperture from any possible alignment with said first and second orifices to permit flow between all of said first, second and third orifices, rotation of said lower aperture by 90° permits fluid to flow only between said first and said third orifices and rotation by an additional 180° into an alternate selective position permits fluid flow only between said second and third orifices.

2. A valve according to claim 1 wherein the head portion of said double-leg T-shaped bore is adapted for alignment between said first and second orifices with said valve stem means in said auxiliary axial and composite rotational positions, the leg portion of said T-shaped bore which is vertical to said lower aperture is adapted for alignment with said first orifice with said valve stem means in said auxiliary axial and said selective rotational positions, and said leg portion which is vertical to said lower aperture is adapted for alignment with said second orifice with said valve stem means in said auxiliary axial and said alternate selective positions.

3. A valve according to claim 2 wherein said actuating means comprises a lever and cam mechanism pivotally connected to said cylindrical member and adapted for actuation to produce said axial movement.

4. A valve according to claim 3 including resilient biasing means adapted to oppose one sense of said axial movement.

5. A valve according to claim 4 including handle means connected to said valve stem means and adapted for actuation to produce said rotary motion thereof.

6. A valve according to claim 2 wherein said first and second orifices are formed in hollow nipples on said valve body, said third orifice is formed in a projection of said cylindrical member, and said nipples and said projection of said cylindrical member are adapted for connection with hollow tubing.